United States Patent [19]

Weber

[11] Patent Number: 5,396,771
[45] Date of Patent: Mar. 14, 1995

[54] APPARATUS FOR TRANSMITTING HYDRAULIC PRESSURE

[76] Inventor: Gisela Weber, Hauptplatz 33, A-2474 Gattendorf, Austria

[21] Appl. No.: 942,794

[22] Filed: Sep. 10, 1992

Related U.S. Application Data

[63] Continuation-in-part of Ser. No. 474,854, Oct. 9, 1990, abandoned.

[30] Foreign Application Priority Data

Apr. 18, 1988 [AT] Austria ........................ 992/88

[51] Int. Cl.6 ........................................... B60T 13/58
[52] U.S. Cl. ............................... 60/563; 60/574; 60/583
[58] Field of Search ............... 60/574, 575, 576, 578, 60/560, 563, 565, 583, 593; 92/164

[56] References Cited

U.S. PATENT DOCUMENTS

| | | | |
|---|---|---|---|
| 2,306,712 | 1/1943 | Peterson et al. | 60/563 X |
| 2,403,912 | 1/1946 | Doll | 60/565 X |
| 2,733,691 | 2/1956 | Johnson | 60/574 |
| 3,407,601 | 10/1968 | Beck | 60/563 X |
| 3,513,656 | 5/1970 | Engle | 60/574 |
| 3,787,147 | 1/1974 | McClocklin et al. | 60/578 X |
| 3,839,866 | 10/1974 | Seidel | 60/574 X |
| 4,271,671 | 6/1981 | Smeets | 60/578 |
| 4,771,604 | 9/1988 | Nakano | 60/578 X |

FOREIGN PATENT DOCUMENTS

| | | |
|---|---|---|
| 0277686 | 8/1988 | European Pat. Off. |
| 2353734 | 12/1977 | France |
| 2491015 | 4/1982 | France |
| 7024806 | 7/1970 | Germany |

Primary Examiner—Edward K. Look
Assistant Examiner—John Ryznic
Attorney, Agent, or Firm—Karl Hormann

[57] ABSTRACT

A hydraulic pressure transmitting apparatus for energizing power cylinders of the kind useful in moving load-carrying platforms on vehicles or the like, being of extremely compact structure on account of a manifold constituted by an end section of a cylinder housing all essential pressure fluid conduits and control valves, as well as connectors for external pressure cylinders being provided with the manifold.

12 Claims, 3 Drawing Sheets

APPARATUS FOR TRANSMITTING HYDRAULIC PRESSURE

This is a continuation-in-part of application Ser. No.: 07/474,854, filed Oct. 9, 1990, now abandoned.

The invention relates to novel apparatus for transmitting hydraulic pressure of the kind useful for moving load-carrying platforms or tailgates of trucks and other cargo vehicles.

Such platforms or tailgates (hereinafter collectively referred to as "platform") are as a rule equipped with hydraulic power cylinder means adapted to impart movement to the platform in vertical directions as well as pivotally. Such power cylinders will hereinafter be referred to as lifting cylinder and closing cylinder, respectively. When such a hydraulically operated platform, which has been lowered to the ground and pivoted about its axis to form a drive-on ramp, is being horizontally repositioned for the purpose of subsequent elevation, it is conventional to execute such movements by the use of pressure transmitting apparatus provided in the housing of a hydraulic actuator which also encloses a motor, a pump and a control unit. In such apparatus, the hydraulic cylinder is typically connected to the lifting cylinder and to the closing cylinder of the platform, as well as, by way of hydraulic pressure conduits and fittings, to a control unit. These elements are physically separated from the pressure transmitter in a manner requiring much space, and special pipe connections or fittings are required for their interconnection.

It is, therefore, a general object of the invention to provide an apparatus of the kind referred to which is of compact structure and in which the actuator housing which also encloses the motor and the pump is of small configuration.

A more specific object of the invention resides in the provision of a hydraulic pressure transmitting apparatus of the kind generally useful for pivotally moving a load-carrying structure, such as a tailgate of a truck.

It is yet another object of the invention to provide a hydraulic pressure transmitting apparatus having a manifold for accommodating control valves, pressure conduit connectors or fittings, and the like as an integral part of a hydraulic cylinder.

Preferably, and in accordance with the invention, such apparatus includes a hydraulic cylinder comprising first and second chambers with a piston mounted for sliding movement therein and adapted to be connected to a lifting cylinder and to a closing cylinder of the tailgate by way of hydraulic conduits. Control valves such as a hydraulic fluid return valve and a change-over valve are preferably provided in these conduits, the former valve serving to accommodate the lowering and raising the tailgate by respectively evacuating and blocking evacuation of hydraulic fluid from the respective cylinder to a sump or tank, and the latter valve serving selectively to connect the lifting cylinder or the closing cylinder to the hydraulic cylinder.

According to the invention, the control valves are mounted within bores provided within an integral end section, hereinafter sometimes referred to as a "manifold" of the hydraulic cylinder. In addition, there are provided within, or as integral parts of the manifold, connectors or fittings adapted to be connected to conduits leading to the lifting cylinder and the closing cylinder, to the hydraulic fluid supply and to a discharge reservoir as well as connecting conduits. One each of the connecting conduits is adapted to lead, respectively, to one of the two cylinder chambers on opposite sides of the piston.

Such construction results in a pressure transmission apparatus which is provided with integrated controls and which is extraordinarily compact in its structure, and which may easily be accommodated within the housing of a hydraulic actuator for easy connection with various pressure fittings provided therein.

In accordance with a preferred embodiment of the invention a safety valve and a check valve connected to a pressure fluid feed conduit, as well as a pressure limit switch, may also be provided within the end section manifold of the hydraulic cylinder.

A preferred embodiment of the invention will hereinafter be described in greater detail, with reference to the accompanying drawings, in which.

Figure 1:
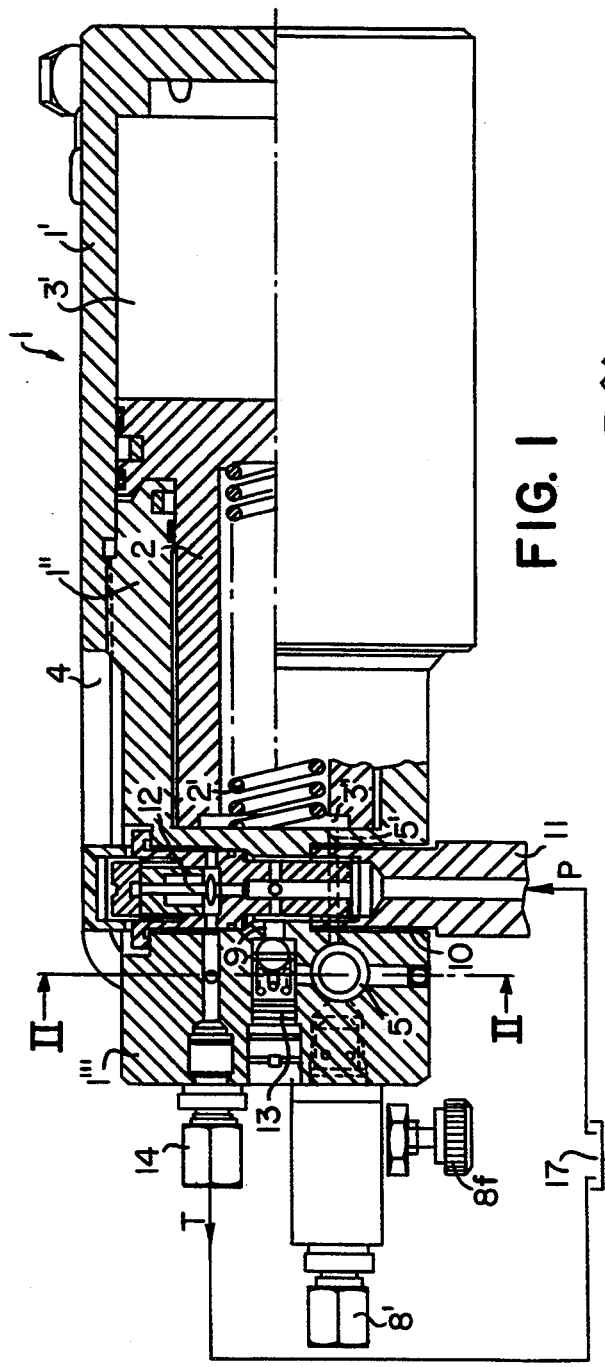
FIG. 1 is a view in partial axial section of an apparatus in accordance with the invention.

As shown, an apparatus of the kind useful for pivotally moving loading platforms of trucks is provided with a hydraulic cylinder 1 consisting of two cylinder members or sections 1', 1" thready connected in axial alignment with each other. A piston 2 is mounted for slideable movement within the cylinder, thus in effect dividing the cylinder into two chambers to be described. As shown in the drawing, the piston 2 is biased toward the right by a coil spring 2'. A cylinder chamber 3' enclosed by cylinder section 1' is connected to a transverse bore or intermediate conduit 5 in an end portion 1''' of the other cylinder section 1" by means of a pipe 4 or first conduit. Cylinder section 1" encloses another cylinder chamber 3". As will hereinafter become apparent, the end portion 1''' is, in fact, a manifold forming a junction for a plurality of hydraulically operating elements and conduits. The diameter of chamber 3' is larger than the diameter of chamber 3". An extension of the piston 2 is received within the lesser diameter chamber 3".

A pilot valve 6 is provided within the bore 5 extending transversely through the manifold 1'''. By way of two parallel conduits feed lines 7, 8 the bore 5 may be selectively connected by the pilot valve 6 to either of two pressure fittings 7', 8'. The conduits 7, 8 may be provided with flow control valves which are also mounted on the manifold 1'''. One of these flow control valves has been shown at 8f as a manually operated valve. As schematically shown, the fitting 7' is connected to a lifting cylinder 7", and the fitting 8' is connected to a closing cylinder 8" of a tailgate 18. The cylinders 7" and 8" as well as the tailgate 18 have been shown schematically in FIG. 3.

The transverse bore or intermediate conduit 5 is also connected to the chamber 3" enclosed by the cylinder portion 1" by way of a bore or second conduit 5'.

Another bore or fluid conduit 10 is extending vertically (as seen in FIG. 1) through the manifold 1'''. A pressure fluid supply conduit 11 is connected to the bore 10 from below. A safety valve 12 is threadedly received within the upper end section of the bore 10. A conduit or passage 9 connects the bore or fluid conduit 10 to the bore 5, and a check valve 13 which blocks the passage of fluid from bore 5 to bore 10 is provided within the conduit 9. By way of the safety valve 12 the bore 10 is also connected to a fitting or pressure fluid discharge 14 adapted to lead to a hydraulic fluid reservoir or sump schematically shown at 17.

Figure 2:
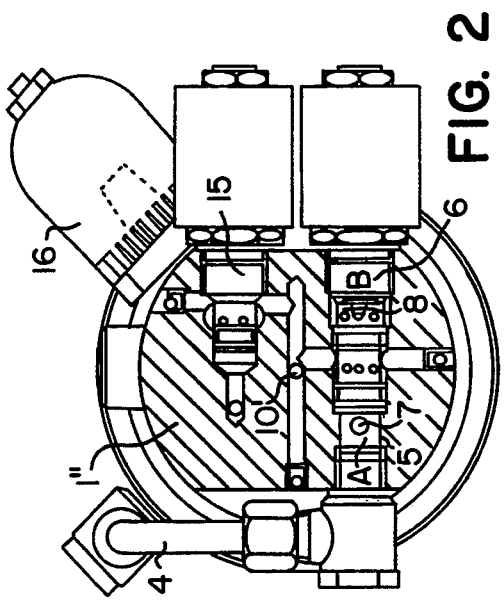
FIG. 2 is a cross-sectional view along line II—II of the apparatus of FIG. 1.
Figure 3:
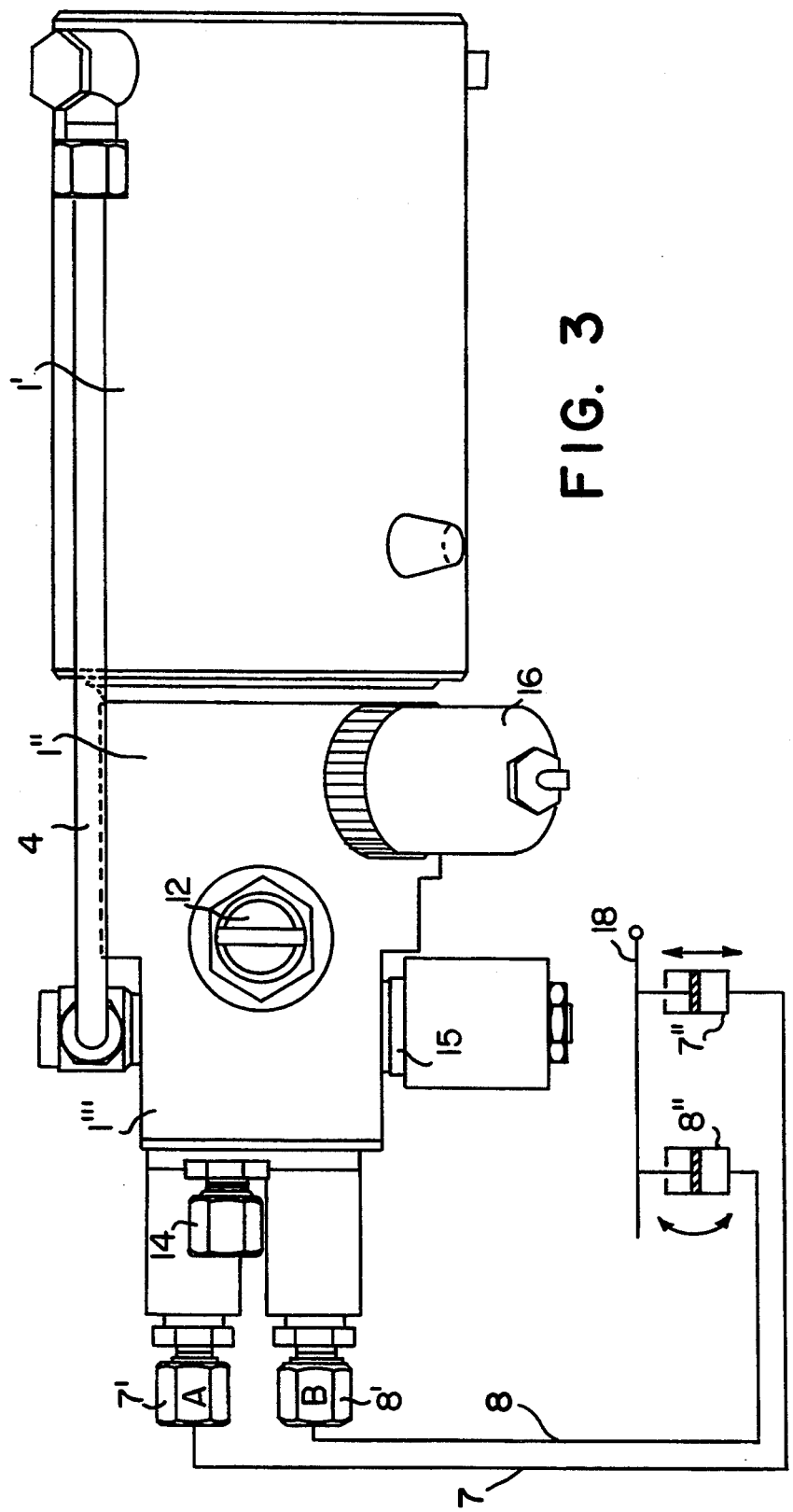
FIG. 3 is an elevational top view of the apparatus of FIG. 1.
Figure 4:
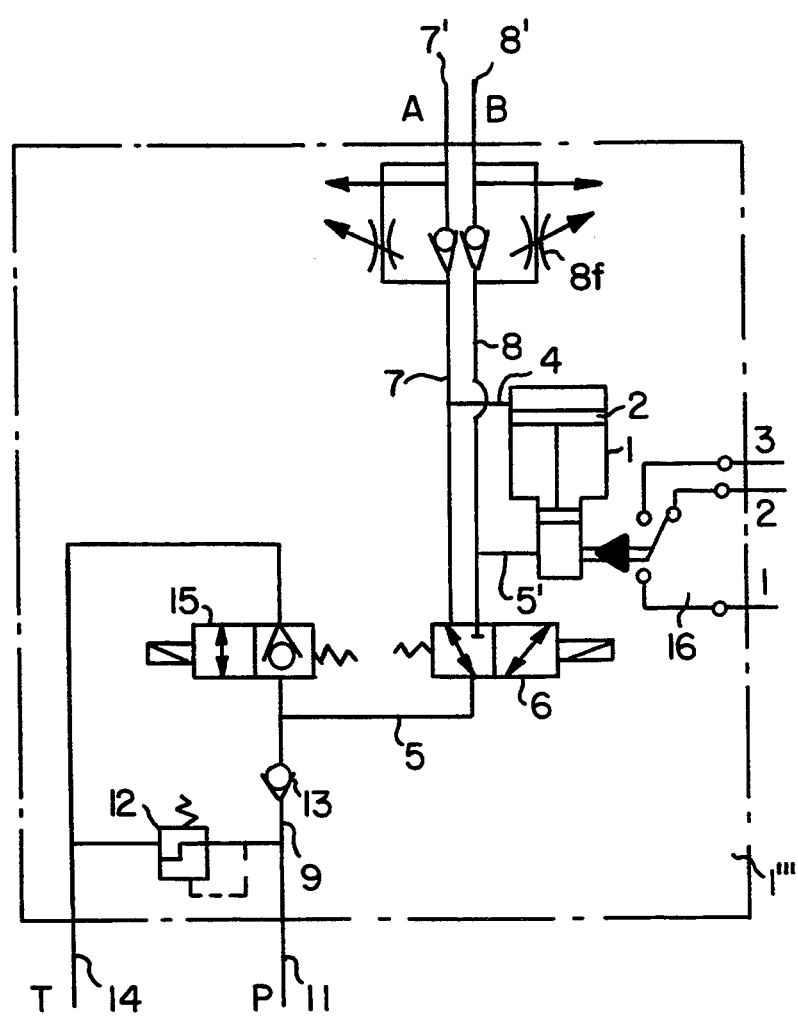
FIG. 4 is a schematic representation of the hydraulic control circuit of an apparatus in accordance with the invention.

As seen in FIG. 2, there is provided within the manifold 1''' of the cylinder section 1'', and in parallel to the pilot valve 6, a control valve 15 which is positioned at the junction between the valve 6 or the transverse bore 5 and the fitting 14. Depending upon the switching position of valve 6, the valve 15 serves at times to evacuate hydraulic fluid from either cylinder 7'' or cylinder 8'' to the reservoir or sump 17, or to block the flow of fluid to the sump when hydraulic fluid is to be fed to either of the cylinders 7'', 8''. As also shown in FIGS. 2 and 3, a pressure limit switch 16 is also provided within the cylinder section 1'' to prevent overloading of the apparatus.

For lowering the tailgate 18 from an elevated horizontal position to a lowered position, the valve 15 may be electrically actuated so that pressure fluid will be evacuated from the lifting cylinder 7'' into the sump 17 by way of fitting 7' and other conduits provided within the cylinder section 1'', i.e. the pilot valve 6 open towards the bore 5 and the sump fitting 14. As soon as the tailgate 18 touches ground there will no longer be any pressure in the lifting cylinder 7''. The piston 2 will thus be moved to the right from its position shown in FIG. 1 under the forces of the spring 2' and the pressure fluid acting on the lesser surface of the piston 2 by way of the bore 5'. The fluid flowing from the cylinder chamber 3' through the conduit 4 will flow to the sump 17. Under its own weight, or under the weight of a load, the tailgate 18 will pivot into an inclined orientation to form a drive-on ramp.

For raising the tailgate 18, the valve 15 will be closed, and pressure fluid will be supplied to the cylinder chamber 3' on the right of FIG. 1, by way of the valve 6 and the first conduit 4. The piston 2 will thus move to the left. The force generated by the piston 2 is preferably three times the force generated when the opposite face of the piston 2 is subjected to pressure fluid. The pressure fluid evacuated by the conduit 5' is applied to the closing cylinder 8'' by way of conduit 8' for moving the tailgate 18 into a horizontal position. This process terminates as soon as the piston 2 has reached its left terminal position it ceases moving, and the lifting cylinder 7'' is pressurized again.

As will be seen from the above description all controls necessary for moving the tailgate are integrated into the pressure transmission apparatus which may be mounted as a unitary compact unit into the actuating apparatus of the tailgate.

What is claimed is:

1. An apparatus of compact structure for transmitting pressure fluid relative to lifting and closing cylinder means associated with moveable platform means, comprising:

hydraulic cylinder means separated into first and second cylinder chamber means of different diameter by piston means mounted for reciprocal movement within said hydraulic cylinder means;

manifold means integral with said hydraulic cylinder means and provided with pressure fluid supply conduit means, pressure fluid discharge means and intermediate conduit means, and further comprising:

first conduit means for connecting one of said first and second cylinder chamber means to said intermediate conduit means;

second conduit means for connecting the other of said first and second cylinder chamber means to said intermediate conduit means;

pilot valve means connected intermediate said intermediate conduit means and said first and second conduit means and adapted for alternately connecting said lifting and closing cylinder means to said intermediate conduit means;

control valve means selectively actuable between First and second states for respectively connecting and disconnecting said intermediate conduit means and said fluid pressure discharge means; and check valve means for providing unidirectional pressure fluid flow from said pressure fluid supply conduit means to said intermediate conduit means.

2. The apparatus of claim 1, further comprising safety valve means associated with said pressure fluid supply conduit means.

3. The apparatus of claim 1, further comprising pressure fitting means adapted to connect said intermediate conduit means to said lifting and closing cylinder means.

4. The apparatus of claim 3, further comprising manually actuable flow control valve means intermediate said pressure fitting means and said intermediate conduit means.

5. The apparatus of claim 1, further comprising pressure limit switch means associated with said pressure fluid supply conduit means.

6. The apparatus of claim 5, wherein the diameter of said other of said first and second cylinder chamber means is smaller than the diameter of said one cylinder chamber means.

7. The apparatus of claim 6, wherein said piston means comprises an extension slideably received within said other of said cylinder chamber means.

8. The apparatus of claim 7, wherein pressure spring means is provided within said other of said cylinder chamber means for biasing said piston means toward said one cylinder chamber means.

9. The apparatus of claim 1, wherein at least one of said pilot valve means and said control valve means is electrically actuated.

10. A hydraulic apparatus of compact structure for driving lifting cylinder means and closing cylinder means of a loading platform of a vehicle, comprising:

hydraulic cylinder means separated into first and second cylinder chamber means by piston means mounted for reciprocal movement within said hydraulic cylinder means, said first cylinder chamber having a diameter larger than said second cylinder chamber, manifold means integral with said hydraulic cylinder means and provided with pressure fluid supply conduit means, pressure fluid discharge means, first fitting means adapted to be connected to said lifting cylinder means, second fitting means adapted to be connected to said closing cylinder means, and intermediate conduit means having first and second sides;

said first cylinder chamber means and said first fitting means being connected to one of said first and second sides of said intermediate conduit means and said second cylinder chamber means and said second fitting means being connected to the other of said first and second sides of said intermediate conduit means, said manifold means further comprising:

pilot valve means associated with said intermediate conduit means and adapted for alternately connecting said pressure fluid supply conduit means to said first and second sides of said intermediate conduit means;

control valve means selectively actuable between first and second states for alternately connecting said fluid supply conduit means to said discharge means and to said pilot valve means, and check valve means for providing unidirectional flow of fluid between said pressure fluid supply conduit means and said pilot valve means.

11. The apparatus of claim 10, wherein said manifold means further comprises safety valve means associated with said pressure fluid supply conduit means.

12. The apparatus of claim 10, wherein said manifold means further comprises pressure limiting switch means.

* * * * *